US006529138B2

(12) United States Patent
Satoh

(10) Patent No.: US 6,529,138 B2
(45) Date of Patent: *Mar. 4, 2003

(54) REMOTE-CONTROL-SIGNAL-RECEIVING DEVICE

(75) Inventor: Junichi Satoh, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 4 days.

(21) Appl. No.: 09/201,334

(22) Filed: Nov. 30, 1998

(65) Prior Publication Data

US 2002/0105433 A1 Aug. 8, 2002

(30) Foreign Application Priority Data

Dec. 12, 1997 (JP) ............................................ 9-342759
Nov. 13, 1998 (JP) .......................................... 10-323692

(51) Int. Cl.[7] ................................................ H04Q 1/00

(52) U.S. Cl. ............................. 340/825.5; 340/825.69; 340/825.72; 359/142; 359/146; 359/147; 359/148; 455/132; 455/133

(58) Field of Search ......................... 340/825.5, 825.69, 340/825.72; 359/142, 146, 147, 148; 455/132, 133

(56) References Cited

U.S. PATENT DOCUMENTS

| | | | | | |
|---|---|---|---|---|---|
| 4,430,652 | A | * | 2/1984 | Rothenbuhler et al. | 340/825.69 |
| 5,008,662 | A | * | 4/1991 | Tokizane et al. ....... | 340/825.06 |
| 5,402,257 | A | * | 3/1995 | Hasselmann et al. ....... | 359/144 |
| 5,937,005 | A | * | 8/1999 | Obichi et al. ............... | 375/224 |
| 6,173,014 | B1 | * | 1/2001 | Forssen et al. ............. | 375/267 |

* cited by examiner

*Primary Examiner*—Michael Horabik
*Assistant Examiner*—M Shimizu
(74) *Attorney, Agent, or Firm*—Robin, Blecker & Daley

(57) ABSTRACT

A remote-control-signal receiving device includes a plurality of signal receiving parts for receiving remote-control signals, a plurality of decoders for decoding the remote-control signals received by the plurality of signal receiving parts, and a signal processing part for determining the reliability of data outputted from the plurality of decoders on the basis of the data.

11 Claims, 7 Drawing Sheets

REMOTE-CONTROL-SIGNAL-RECEIVING DEVICE

BACKGROUND OF THE INVENTION

1. Field of the Invention

The present invention relates to a remote-control-signal receiving device having a plurality of light receiving parts for receiving remote-control signals of, for example, infrared rays, and also to a computer-readable storage medium for use with the remote-control-signal receiving device.

2. Description of Related Art

A method for transmitting remote-control signals by means of infrared rays has heretofore popularly been employed in operating an electric apparatus or the like at a distance away from the apparatus. However, infrared rays have a highly linear propagating property, while light receiving parts which are used for receiving the remote-control signals have some directivity. Therefore, if a remote-control signal is transmitted, for example, from the reverse side of the light receiving part, the remote-control signal tends to be not adequately received. In view of this problem, some of known remote operating devices have been arranged to use a plurality of light receiving parts for receiving remote-control signals from various directions.

The known remote operating devices of the kind having a plurality of light receiving parts have been arranged in varied manners. One type of such devices is arranged to supply outputs of these light receiving parts to one decoder by adding the outputs together. Another type is arranged to have a switch circuit for selecting one of outputs of the light receiving parts at a time, to supply these outputs to one decoder by serially switching the selection from one output over to another by means of the switch circuit, and, if a signal thus outputted from any of the selected light receiving parts is found to be of a specific pattern, that signal is supplied to the decoder to obtain a decoded output by holding the switch circuit, as disclosed in Japanese Laid-Open Patent Application No. HEI 6-105382.

However, the remote operating devices of the above-stated types have respectively presented problems. In the former type, if a noise enters one of the light receiving parts, an accurate decoding process becomes impossible, even if remote-control signals are received in a normal state by the other light receiving parts, because of the arrangement for adding together the outputs of the light receiving parts. Although the latter type is strong against noises as it is arranged to make a check for the specific pattern, the device can receive only one command when different commands reach the light receiving parts at about the same time. Another problem with the latter type lies in that the serial switching arrangement causes a delay of response from a signal transmitting side. A further problem with the latter type lies in that it necessitates use of a hardware switch circuit which causes an increase in space and cost.

BRIEF SUMMARY OF THE INVENTION

The invention is aimed at the solution of the above-stated problems. It is, therefore, an object of the invention to provide a remote-control-signal receiving device which is capable of promptly and accurately responding to a signal inputted to each of light receiving parts.

It is another object of the invention to enhance the reliability of data communication so as to prevent erroneous actions, communication errors, etc.

To attain the above objects, in accordance with an aspect of the invention, there is provided a remote-control-signal receiving device, which comprises a plurality of signal receiving means for receiving remote-control signals, a plurality of decoding means for decoding the remote-control signals received respectively by the plurality of signal receiving means, and processing means for processing the remote-control signals decoded by the plurality of decoding means.

Further, in accordance with another aspect of the invention, there is provided a control method for use with remote-control communication, which comprises a signal receiving step of receiving remote-control signals by a plurality of signal receiving means, a decoding step of individually decoding the plurality of remote-control signals received, and a signal processing step of processing the remote-control signals decoded.

It is a further object of the invention to provide a remote-control-signal receiving device which is arranged to promptly and accurately respond to signals inputted to light receiving parts and also to set an order of precedence in processing the input signals.

To attain the above object, in accordance with an aspect of the invention, there is provided a remote-control-signal receiving device, which comprises a plurality of signal receiving means for receiving remote-control signals, a plurality of decoding means for decoding the remote-control signals received respectively by the plurality of signal receiving means, and processing means for processing the remote-control signals decoded by the plurality of decoding means, wherein the processing means compares outputs of the plurality of decoding means with each other to determine reliability of the outputs.

It is a further object of the invention to provide a data input device for a personal computer or the like or to provide a remote-control communication device for inputting and outputting data to and from peripheral devices of varied kinds.

These and other objects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

Figure 1:
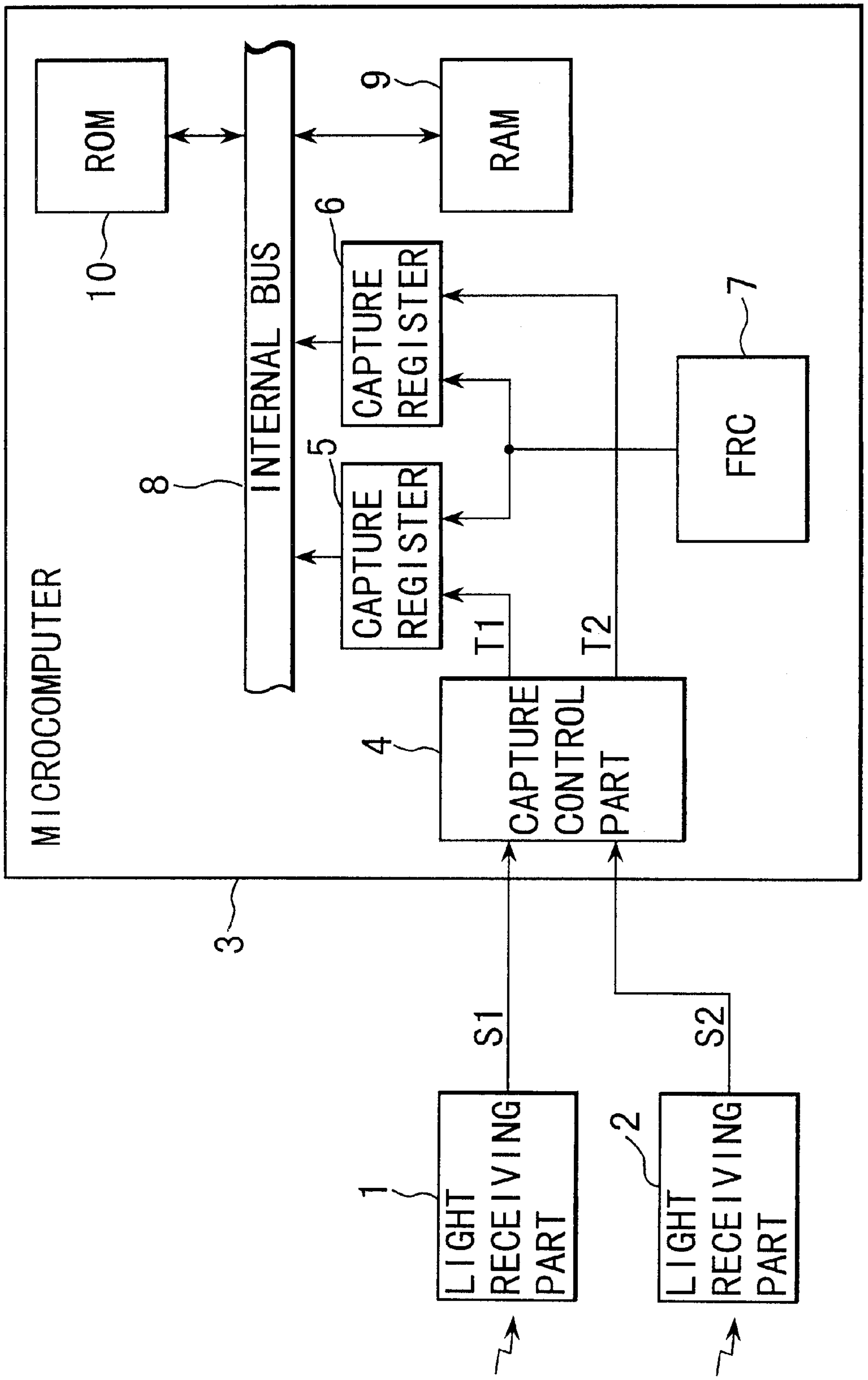
FIG. 1 is a block diagram showing a remote-control-signal receiving device according to each of first and second embodiments of the invention.
Figure 2:
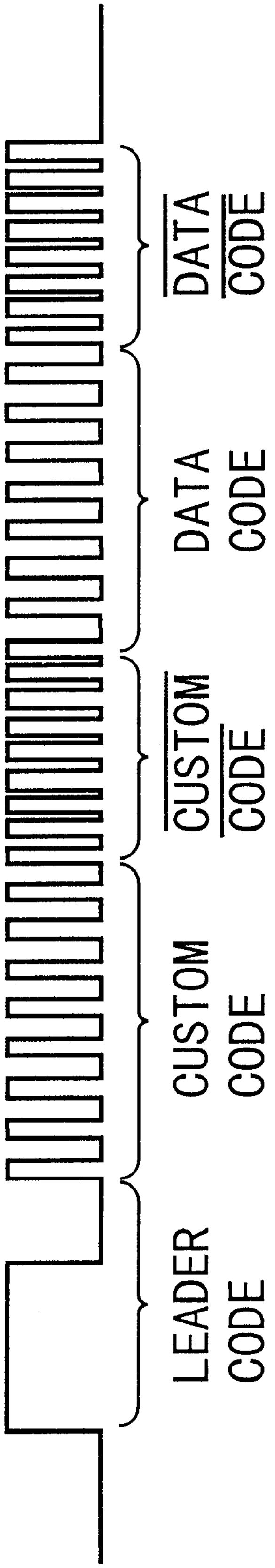
FIG. 2 is a timing chart showing by way of example a remote-control signal.
Figure 3:
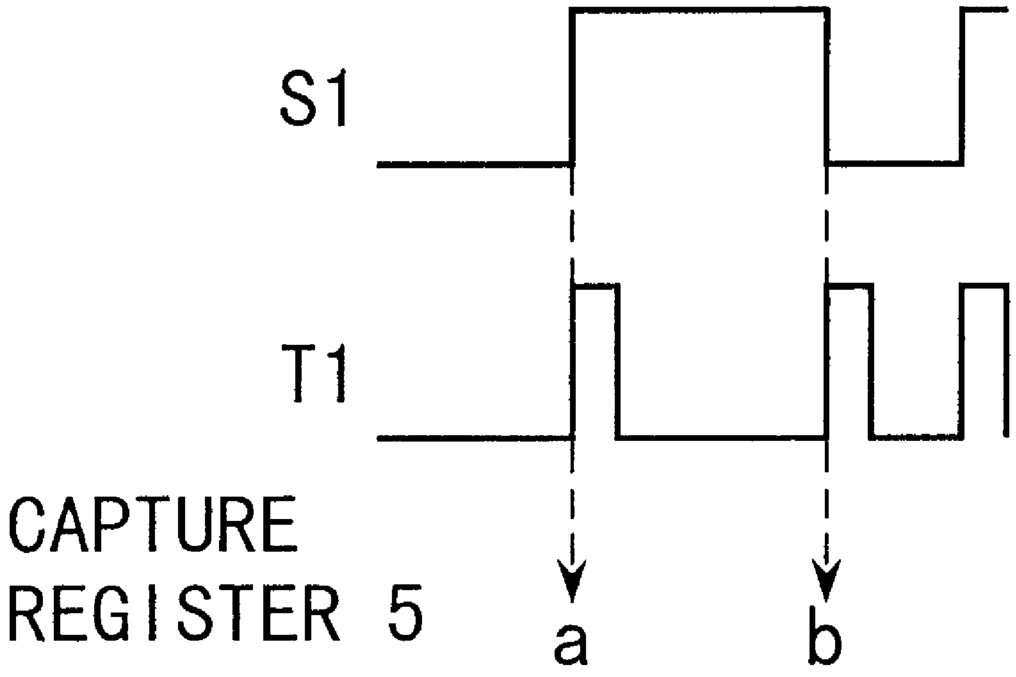
FIG. 3 is a timing chart showing the action of a capture register.
Figure 4:
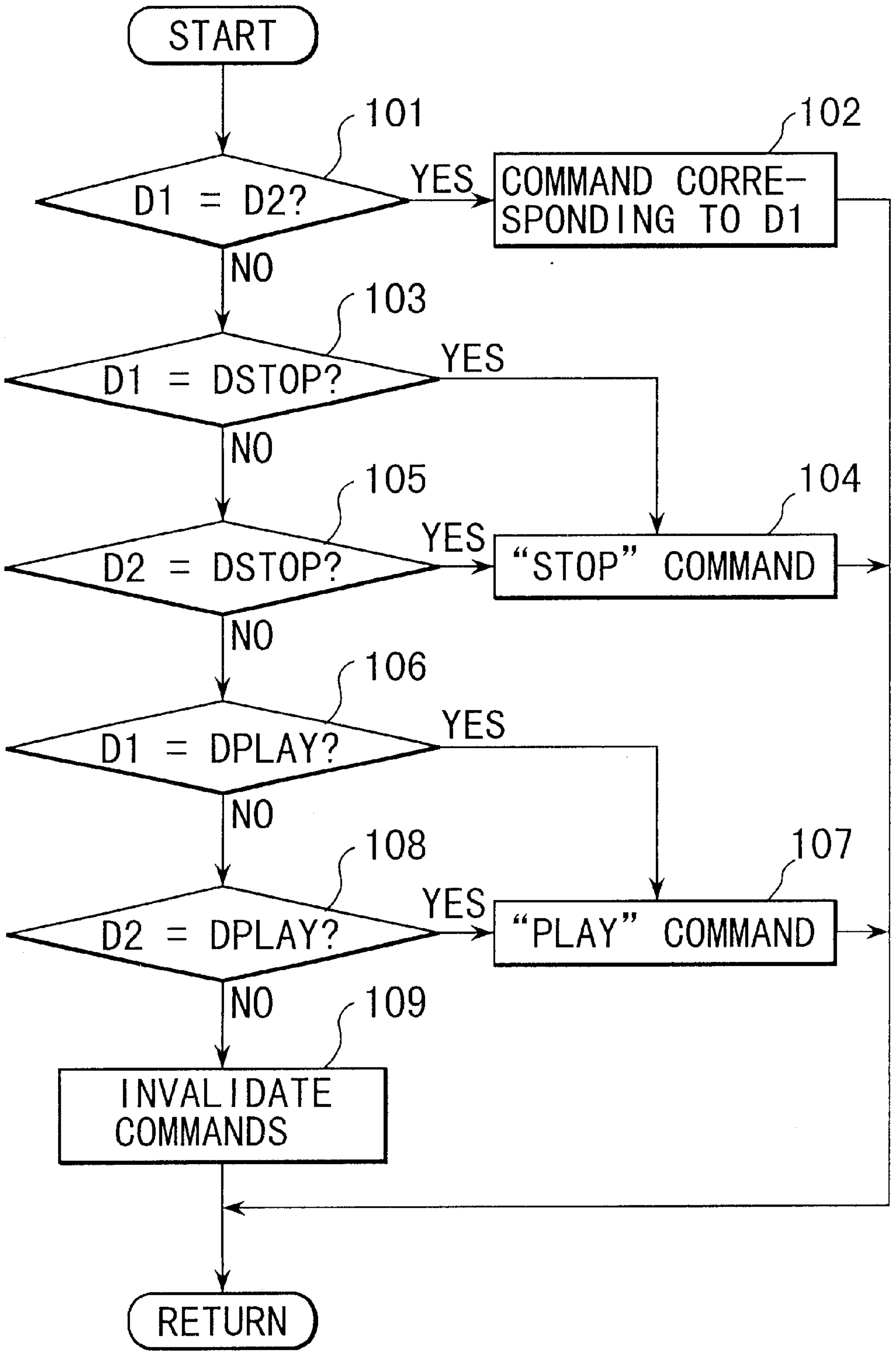
FIG. 4 is a flow chart showing a flow of operation of the first embodiment of the invention.

FIGS. 1 to 4 relate to a remote-control-signal receiving device according to a first embodiment of the invention. FIG. 1 is a block diagram showing the remote-control-signal receiving device. FIG. 2 shows by way of example a remote-control signal. FIG. 3 is a timing chart. FIG. 4 is a flow chart. Referring to FIG. 1, light receiving parts 1 and 2 are arranged to receive infrared remote-control signals. Each of the light receiving parts 1 and 2 is composed of a light receiving sensor, a band-pass filter for extracting a remote-control signal, an amplifier, etc. Further, in order to receive signals coming from various directions, the light receiving parts 1 and 2 are disposed, for example, in front of and in rear of the device, respectively. Signals S1 and S2 outputted from the light receiving parts 1 and 2 are supplied, through ports of a microcomputer 3, to a capture control part 4 disposed within the microcomputer 3.

FIG. 2 shows by way of example the signal S1 or S2 (remote-control signal) outputted from the light receiving part 1 or 2. In FIG. 2, an abscissa axis indicates a time base, and one cycle of the signal S1 or S2 is composed of, in the order of transmission, a leader code part, a custom code part, an inverted custom code part, a data code part and an inverted data code part. Then, this cycle is repeated. The leader code is provided as a trigger for a start of the remote-control signal. The custom code indicates a manufacturer or a type of apparatus. The data code represents a command or the like. The pulse width, etc., of each of these codes are determined beforehand.

Referring again to FIG. 1, when the signal S1 is supplied from the light receiving part 1 to the capture control part 4, the capture control part 4 generates a trigger signal T1 at the rise and at the fall of the signal S1. The trigger signal T1 is supplied to a capture register 5. When the signal S2 is supplied to the capture control part 4, another trigger signal T2 is likewise generated and supplied to another capture register 6 at the rise and at the fall of the signal S2. Meanwhile, the output of a free-running counter (FRC) 7 is also supplied to the capture registers 5 and 6. The count value of the free-running counter 7 obtained at a point of time when the trigger signal T1 or T2 is supplied is taken into the capture register 5 or 6. The capture registers 5 and 6, a ROM 10 and a RAM 9 are connected to an internal bus 8.

Figure 5:
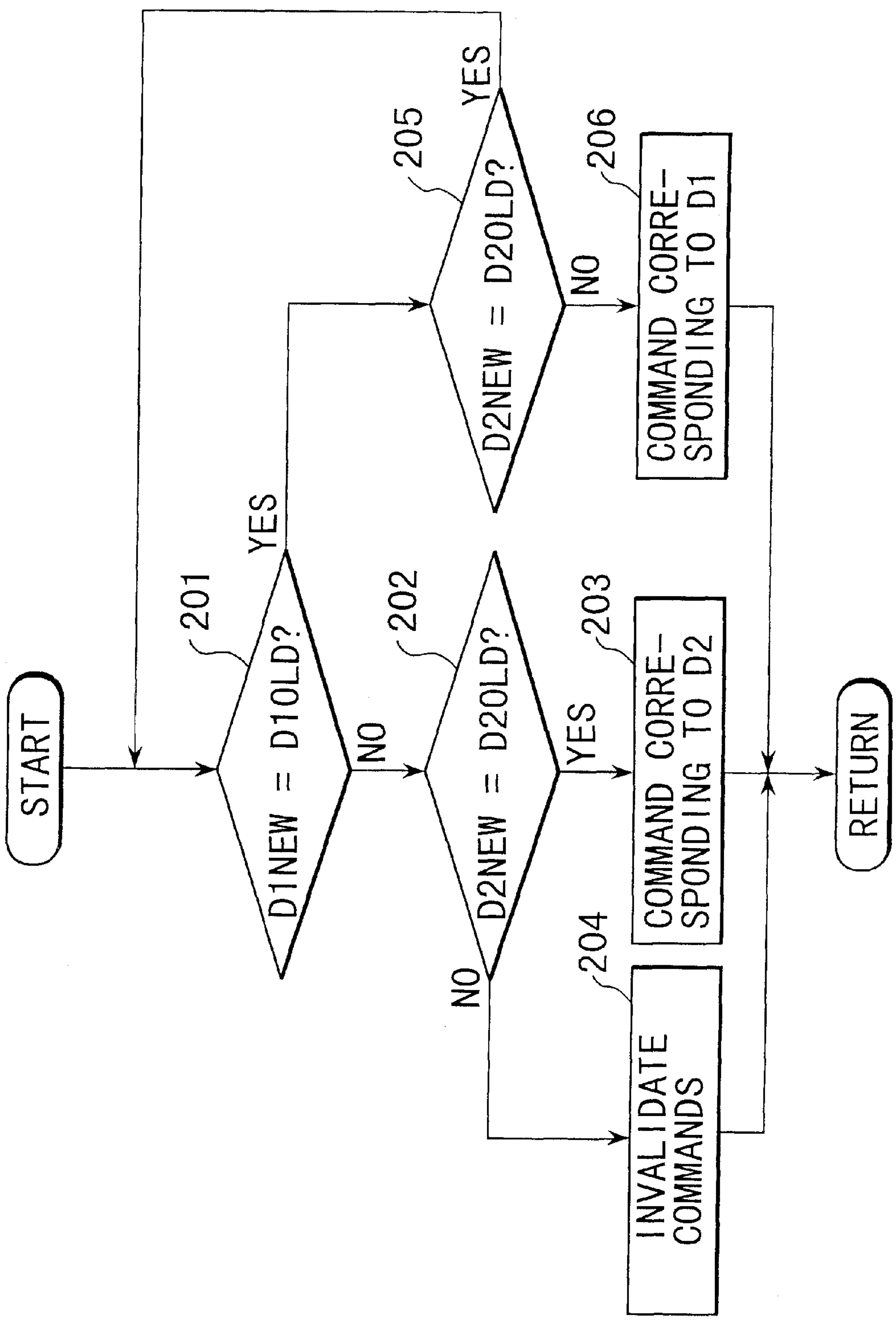
FIG. 5 is a flow chart showing a flow of operation of the second embodiment of the invention.

The ROM 10 is a storage medium arranged according to the invention to store a program of processes to be executed by the microcomputer 3 in a manner as shown in a flow chart in FIG. 4 or 5. For the storage medium, a semiconductor memory, an optical disk, a magneto-optical disk, a magnetic medium or the like is used.

Next, a method of decoding the remote-control signal received by the light receiving part 1 is described with reference to FIG. 3. Referring to FIG. 3, when a rise signal of the leader code part of the signal S1 from the light receiving part 1 is inputted to the capture control part 4, the trigger signal T1 is generated. Then, a value "a" of the free-running counter 7 obtained at this point of time is taken into the capture register 5. This value "a" is sent to the RAM 9 through the internal bus 8.

Subsequently, the trigger signal T1 is generated also at the fall of the leader code part of the signal S1. Then, a value "b" of the free-running counter 7 obtained at this point of time is taken into the capture register 5 to be also sent to the RAM 9. Here, a period during which the leader code is at a high (H) level can be obtained in accordance with the following formula by an arithmetic operation means which is disposed within the microcomputer 3:

$$(b-a)\times(\text{internal clock})$$

The high (H) and low (L) level periods of every code part of the remote-control signal are also obtained in the same manner as mentioned above. Then, if the leader code and the custom code of the remote-control signal are decided to coincide with a pattern stored beforehand, data (command) of the data code is written into the RAM 9. The written data is compared with command data which has been stored beforehand. Then, which of the commands indicated by data in storage is received is judged and decided through this comparison process.

The signal S2 from the light receiving part 2 can be likewise decoded by using the trigger signal T2 and the capture register 6. Even if the signals S1 and S2 are simultaneously supplied from the light receiving parts 1 and 2 to the microcomputer 3, the commands carried respectively by the signals S1 and S2 can be found by the microcomputer 3, because there are independently provided the trigger signals T1 and T2 and the capture registers 5 and 6 for the signals S1 and S2.

After the data code (command data) is found with the remote-control signal decoded as described above, the microcomputer 3 in the first embodiment acts to execute procedures by means of software as shown in the flow chart of FIG. 4. In the case of the first embodiment, the invention is, for example, applied to a VTR (video tape recorder). Thus, the light receiving parts 1 and 2 and the microcomputer 3 are contained in the VTR to act in response to commands received from a remote controller.

Further, in the first embodiment, the order of precedence in receiving the commands is as follows. A STOP command which is for bringing the action of a tape to a stop has a first priority. A PLAY command for a reproducing action has a second priority. Other commands are arranged to have equal priority. In the flow chart of FIG. 4, reference symbol "D1" denotes command data of a remote-control signal which has been received at the light receiving part 1 and then decoded. Reference symbol "D2" denotes command data of a remote-control signal which has been received at the light receiving part 2 and then decoded. Reference symbol "DSTOP" denotes data of the STOP command. Reference symbol "DPLAY" denotes data of the PLAY command. In a case where one of the command data D1 and D2 is found while the other is either a noise or a code for an apparatus of a different manufacturer, the found command data is of course considered to be valid.

In the case of the flow chart shown in FIG. 4, the microcomputer 3 is assumed to be operating when valid commands are inputted at the same time to the light receiving parts 1 and 2. Referring to FIG. 4, when command data D1 and D2 received by the two light receiving parts 1 and 2 are found, at a step 101, to be the same, the flow of operation proceeds to a step 102 to validate a command corresponding to the command data D1. In this instance, even if the remote-control signals inputted to the light receiving parts 1 and 2 have a time lag by some cause such as reflection or the like, the amount of such time lag can be absorbed and made to be negligible by arranging the cycle of calling the routine of FIG. 4 to be larger than a conceivable maximum amount of time lag.

If the command data D1 and D2 are found at the step 101 to differ from each other, the flow of operation proceeds to a step 103. At steps 103 and 105, if either of the command data D1 and D2 is found to be data of the STOP command, the flow proceeds to a step 104 to make the STOP command valid. If neither of the command data D1 and D2 is found to be not the data of the STOP command, the flow proceeds to a step 106. At steps 106 and 108, if either of the command data D1 and D2 is found to be data of the PLAY command, the flow proceeds to a step 107 to make the PLAY command valid. If neither of the command data D1 and D2 is found to be not the data of the PLAY command, the flow proceeds to a step 109 to invalidate both of the commands D1 and D2.

In the case of the first embodiment, even when different commands are received respectively at the light receiving parts 1 and 2, the order of precedence can be adequately set for the commands solely by means of the software of the microcomputer 3.

FIG. 5 is a flow chart showing an operation of a second embodiment of the invention. The structural arrangement of the second embodiment is identical with that of the first embodiment shown in FIG. 1. Normal remote-control signals to be processed in the second embodiment are in the pattern shown in FIG. 2. Thus, the signal pattern is repeated in a cycle as long as a button provided on the side of a remote-control-signal transmitting device is pushed. In FIG. 5, reference symbol "D1NEW" denotes latest command data supplied from the light receiving part 1, and reference symbol "D1OLD" denotes command data supplied from the light receiving part 1 preceding the latest command data D1NEW by one cycle. Reference symbol "D2NEW" likewise denotes latest command data supplied from the light receiving part 2, and reference symbol "D2OLD" denotes command data supplied from the light receiving part 2 preceding the latest command data D2NEW by one cycle.

Referring to FIG. 5, at a step 201, a check is made to find if the command data D1 is found to be the same in two succeeding cycles, i.e., if the command data D1NEW is the same as the command data D1OLD. If not, the flow of operation proceeds to a step 202 to find if the command data D2 is found to be the same in two succeeding cycles, i.e., if the command data D2NEW is the same as the command data D2OLD. If so, the reliability of the command data D2 is judged to be higher than that of the command data D1, and the flow proceeds from the step 202 to a step 203. At the step 203, a command which corresponds to the command data D2 is made valid. If the command data D2NEW is found at the step 202 to differ from the command data D2OLD, both the command data D1 and the command data D2 are judged to be not reliable, and the flow proceeds from the step 202 a step 204. At the step 204, both the commands corresponding to the command data D1 and D2 are invalidated.

If the command data D1 is found at the step 201 to be the same in two succeeding cycles and the command data D2 is found at a step 205 to be different in two succeeding cycles, the command data D1 is judged to be more reliable than the command data D2. Then, the flow proceeds from the step 205 to a step 206. At the step 206, the command corresponding to the command data D1 is validated. Further, if the command data D2 also is found at the step 205 to be the same in two succeeding cycles, the flow returns to the step 201 to repeat the flow until one of the two command data having a higher degree of reliability becomes valid.

According to the above-stated arrangement of the second embodiment, a command having a higher degree of reliability can be decided solely by means of the software arrangement of the microcomputer 3.

In the cases of the first and second embodiments described above, the remote-control signals are arranged, by way of example, to be transmitted by means of infrared rays. The arrangement of course may be changed to use some rays of light other than the infrared rays, radio waves or some cables. While the capture and the free-running counter are employed as a decoding means, the same process can be carried out solely by the microcomputer by using, for example, an interruption timer. Further, while each of the first and second embodiments uses two signal-receiving parts for receiving remote-control signals, three or more signal-receiving parts may be used instead of two.

As described above, the remote-control signals received by a plurality of signal-receiving parts can be independently processed in parallel with each other. Therefore, different signals which come through the signal-receiving parts including noises can be quickly and accurately processed.

Since one microcomputer is arranged to contain a plurality of decoding means and a processing means, each of the embodiments is capable of more quickly responding to remote-control signals and permits more efficient use of spaces at a lower cost than the prior art arrangements described in the foregoing.

Further, with different remote-control signals received about the same time, the one having the highest priority among them in the order of precedence is made valid. This arrangement makes it possible to respond to the most important signal even when different remote-control signals are received by the signal-receiving parts at the same time.

Further, since a remote-control signal which is most reliable among remote-control signals received at the same time is made valid, this arrangement makes it possible to respond to the most reliable signal even when different remote-control signal are received by the signal-receiving parts at the same time.

Figure 6:
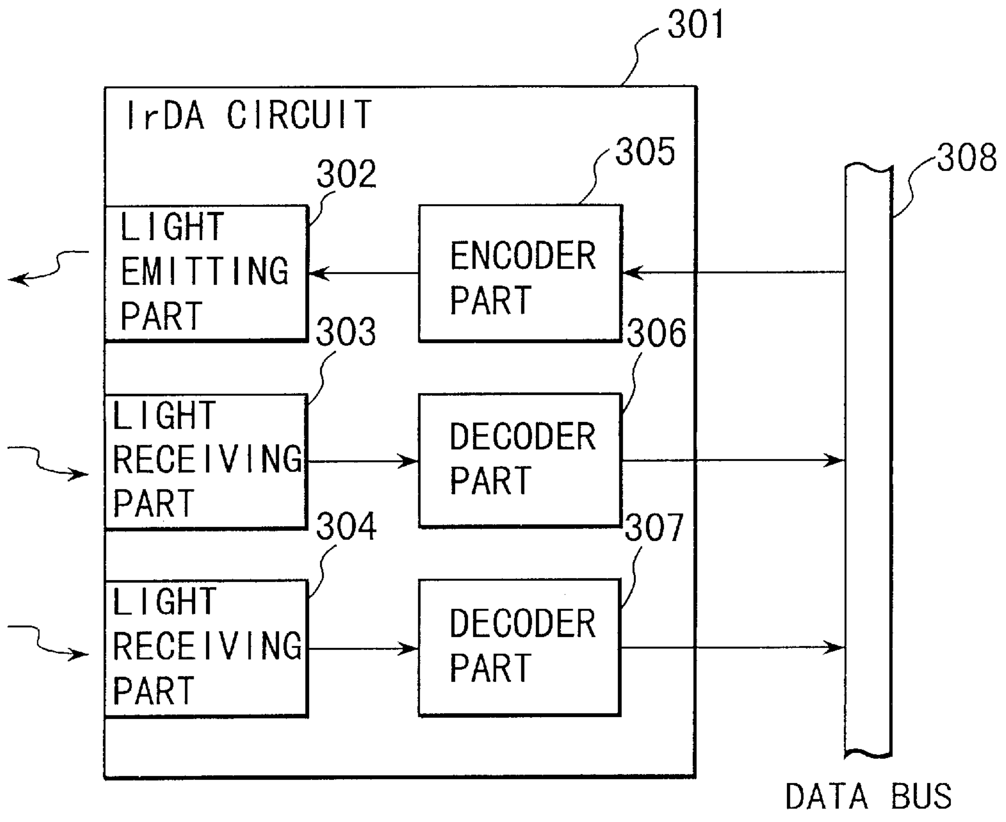
FIG. 6 is a block diagram showing an IrDA (Infrared Data Association) device according to a third embodiment of the invention.
Figure 7:
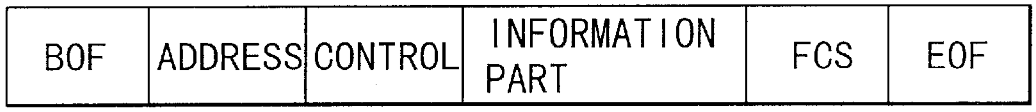
FIG. 7 shows by way of example the data format for the IrDA device.
Figure 8:
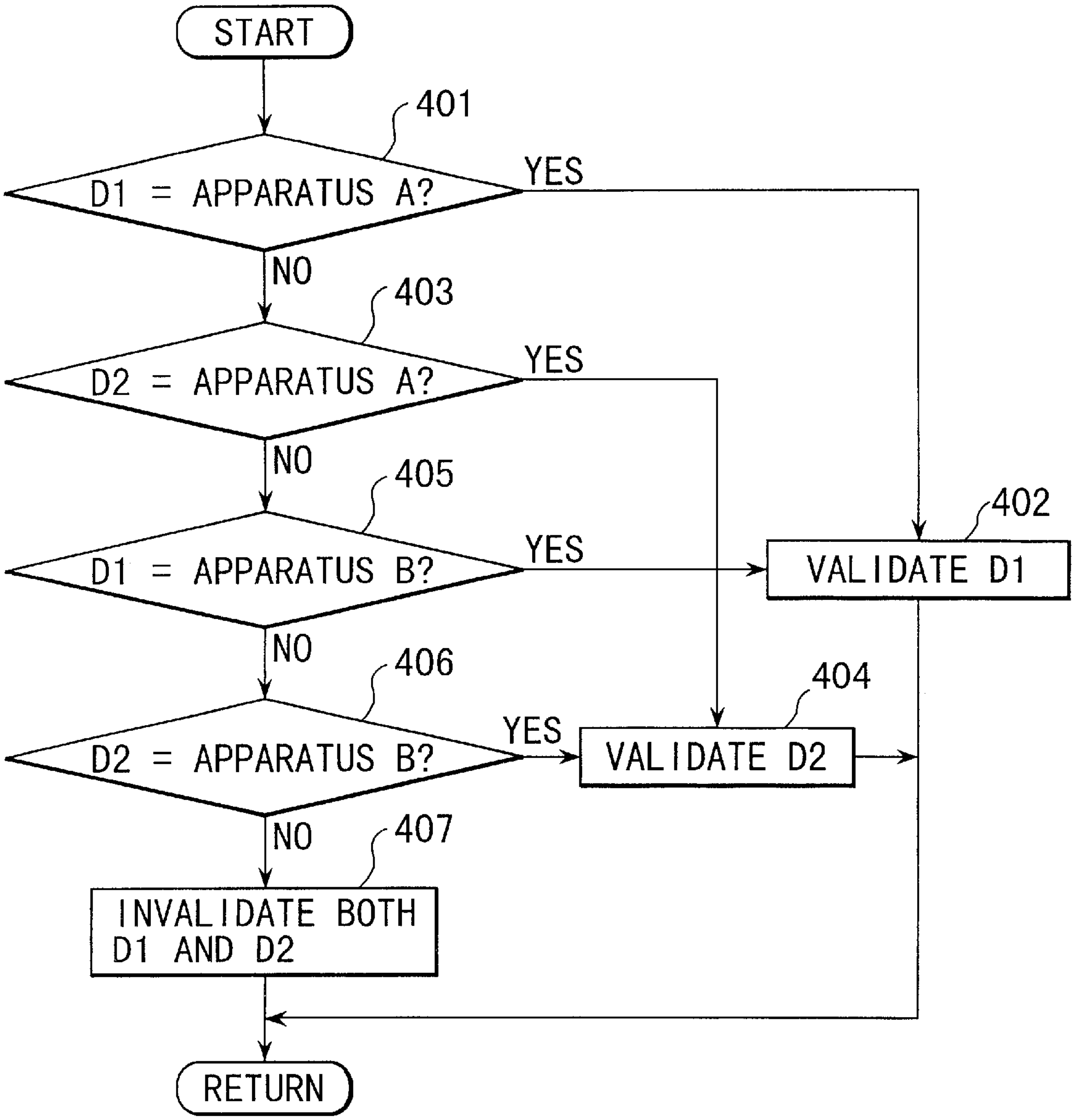
FIG. 8 is a flow chart showing a flow of operation of the third embodiment of the invention.

A third embodiment of the invention is next described with reference to FIGS. 6, 7 and 8. FIG. 6 is a block diagram showing the circuit arrangement of an IrDA (Infrared Data Association) device which is disposed within a personal computer. FIG. 7 shows a data format for the IrDA device. FIG. 8 is a flow chart showing an operation of the third embodiment. Referring to FIG. 6, reference numeral 301 denotes the IrDA circuit. The IrDA circuit 301 includes an infrared light emitting part 302 for signal transmission and infrared light receiving parts 303 and 304 for signal receiving. Each of the infrared light receiving parts 303 and 304 is composed of a light receiving sensor, an amplifier, etc. The light receiving parts 303 and 304 are, for example, disposed in front and in rear of the personal computer, respectively, so as to receive infrared light coming from various directions. The IrDA circuit 301 further includes an encoder part 305 and decoder parts 306 and 307. A data bus 308 is disposed within the personal computer.

Data is transmitted and received in units of one frame as shown in FIG. 7. The beginning of the frame is called "BOF" and the end of the frame is called "EOF". Application data is written in an information part of the frame.

With the third embodiment arranged as described above, when an infrared light signal is received at the light receiving part 303, the signal is amplified and sent to the decoder part 306. Upon receipt of the signal, the decoder part 306 determines whether the signal is in the data format of the IrDA system as shown in FIG. 7 and outputs necessary data (the information part shown in FIG. 7) to the data bus 308. The light receiving part 304 and the decoder part 307 act in conjunction with each other also in the similar manner. In transmitting a signal, on the other hand, data is sent from the data bus 308 to the encoder part 305. Upon receipt of the data, the encoder part 305 converts the data into an infrared signal of the data format of the IrDA system and sends the infrared signal to an applicable apparatus through the light emitting part 302.

With the received signal decoded and found to be the data of the IrDA system as mentioned above, the third embodiment performs an operation by the software of the personal computer as shown in FIG. 8, which is a flow chart. The operation of the personal computer is next described below with reference to the flow chart of FIG. 8.

In the personal computer according to the third embodiment, the order of precedence for receiving commands from various apparatuses is assumed to be "apparatus A>apparatus B", and commands coming from any apparatus other than the apparatuses A and B are assumed to be invalid. Further, data decoded by the decoder part 306 is assumed to be "D1", data decoded by the other decoder part 307 is assumed to be "D2", and numbers assigned to the signal transmitting apparatuses (apparatuses A and B, etc.) are assumed to be included in the data.

At a step 401 of the flow chart of FIG. 8, a check is made to find if the data D1 is data sent from the apparatus A. If so, the flow of operation proceeds to a step 402 to make the data D1 valid. If not, the flow proceeds to a step 403. At the step 403, a check is made to find if the data D2 is data sent from the apparatus A. If so, the flow proceeds from the step 403 to a step 404 to make the data D2 valid. If not, the flow proceeds from the step 403 to a step 405. At the step 405, a check is made to find if the data D1 is data sent from the apparatus B. If so, the flow proceeds from the step 405 to the step 402 to make the data D1 valid. If not, the flow proceeds from the step 405 to a step 406. At the step 406, a check is made to find if the data D2 is data sent from the apparatus B. If so, the flow proceeds from the step 406 to the step 404 to make the data D2 valid. If not, the flow proceeds from the step 406 to a step 407. At the step 407, both the data D1 and D2 are invalidated.

In the case of the third embodiment, even if the two light receiving parts respectively receive commands from different apparatuses, the commands from the different apparatuses can be processed in the order of precedence solely by means of the software of the personal computer.

In the case of the third embodiment also, normal signals of the IrDA system are sent by repeating the frame pattern shown in FIG. 7 a certain number of times.

Then, the reliability of command data can be accurately judged by carrying out the same processes as the flow chart shown in FIG. 5, with the data "D1NEW" assumed to be the latest command data from the light receiving part 303, the data "D1OLD" assumed to be command data immediately preceding the latest command data D1NEW, the data "D2NEW" assumed to be the latest command data from the other light receiving part 304, and the data "D2OLD" assumed to be command data immediately preceding the latest command data D2NEW.

The above-stated arrangement enables the third embodiment to accurately judge the reliability of the command data by means of the software of the personal computer. Further, in accordance with the invention, the number of remote-control-signal receiving parts, i.e., the light receiving parts, is not limited to two but may be increased to three or more.

As described in the foregoing, each of the embodiments of the invention disclosed is simply arranged to be composed of a plurality of remote-control-signal receiving parts and a microcomputer (personal computer). According to the invention, therefore, a signal receiving device can be reliably arranged at a low cost to permit efficient use of space, to be capable of processing a plurality of remote-control signals almost at the same time to ensure quick response to transmitted commands, and to be strong against noises, as the device is capable of absorbing such a temporal discrepancy that is caused by reflection or the like. Further, since almost all processes are carried out by means of the software of the microcomputer, the device can be arranged to receive signals in various manners by just changing a program. The invention, therefore, excels in applicability to a wide range of purposes.

What is claimed is:

1. A remote-control-signal receiving device comprising:

a plurality of signal receiving means for receiving remote-control command signals;

a plurality of decoding means for decoding the remote-control command signals received respectively by said plurality of signal receiving means;

a control means having a memory storing a program of a process which is executed by said control means; and processing means controlled by said control means to execute the process based on the program for selecting a remote-control command having the highest priority or the highest reliability in the plurality of the remote-control commands decoded by the plurality of said decoding means in the case that the plurality of said signal receiving means received respectively the plurality of the remote-control command signals at about same time, wherein said processing means validates a selected remote-control command having the highest priority or the highest reliability and invalidates non-selected remote-control commands when the process is executed by said processing means.

2. A remote-control-signal receiving device according to claim 1, wherein said plurality of decoding means, said control means and said processing means are contained in one microcomputer.

3. A remote-control-signal receiving device according to claim 1, wherein said processing means for selecting the remote-control command having the highest priority or highest reliability in the plurality of the remote-control commands decoded by the plurality of said decoding means in accordance with definitions described in the program.

4. A remote-control-signal receiving device according to claim 3, wherein said processing means for selecting the remote-control command having the highest priority in the plurality of the remote-control commands decoded by the plurality of said decoding means according to the types of the remote-control commands.

5. A remote-control-signal receiving device according to claim 3, wherein said processing means for selecting the remote-control command having the highest reliability in the plurality of the remote-control commands decoded by the plurality of said decoding means according to a number of times which received the remote-control commands by each signal receiving means.

6. A remote-control-signal receiving device according to claim 3, wherein said processing means for selecting the remote-control command having the highest priority or highest reliability in the plurality of the remote-control commands decoded by the plurality of said decoding means according to receiving status of said signal receiving means.

7. A remote-control-signal receiving device according to claim 1, wherein said processing means invalidates all of the remote-control commands when said processing means cannot discriminate the remote control command having the highest priority or the highest reliability.

8. A remote-control-signal processing method comprising the steps of a signal receiving step of receiving remote-control command signals by a plurality of signal receiving means;

a decoding step of individually decoding the plurality of remote-control command signals received in said receiving step; and a signal processing step of executing a selection for a remote-control command having the highest priority or the highest reliability in the plurality of the remote-control commands decoded in said decoding step in the case that the plurality of said signal receiving means received respectively the plurality of the remote-control command signals at about same time, wherein said signal processing step of validating a selected remote-control command having the highest priority or the highest reliability and invalidating non-selected remote-control commands when the selection of the remote-control command is executed.

9. A remote control signal processing method according to claim 8, wherein the signal processing step of invalidating all of the remote-control commands when the remote-control command having the highest priority or the highest reliability is not discriminated.

10. A recording medium on which stores a program for executing the processes comprising:

a signal receiving step of receiving remote-control command signals by a plurality of signal receiving means;

a decoding step of individually decoding the plurality of remote-control command signals received in said receiving step; and a signal processing step of executing a selection for a remote-control command having the highest priority or the highest reliability in the plurality of the remote-control commands decoded in said decoding step in the case that the plurality of said signal receiving means received respectively the plurality of the remote-control command signals at about same time, wherein said signal processing step of validating a selected remote-control command having the highest priority or the highest reliability and invalidating non-selected remote-control commands when the selection of the remote-control command is executed.

11. A recording medium according to claim 10, wherein the signal processing step of invalidating all of the remote control commands when the remote-control command having the highest priority or the highest reliability is not discriminated.

* * * * *

UNITED STATES PATENT AND TRADEMARK OFFICE

CERTIFICATE OF CORRECTION

PATENT NO. : 6,529,138 B2

DATED : March 4, 2003
INVENTOR(S) : Junichi Satoh

It is certified that error appears in the above-identified patent and that said Letters Patent is hereby corrected as shown below:

Title page,
Item [54], delete in its entirety and insert -- REMOTE-CONTROL-SIGNAL RECEIVING DEVICE --.

Signed and Sealed this

Sixteenth Day of December, 2003

JAMES E. ROGAN
*Director of the United States Patent and Trademark Office*